United States Patent Office 3,233,972
Patented Feb. 8, 1966

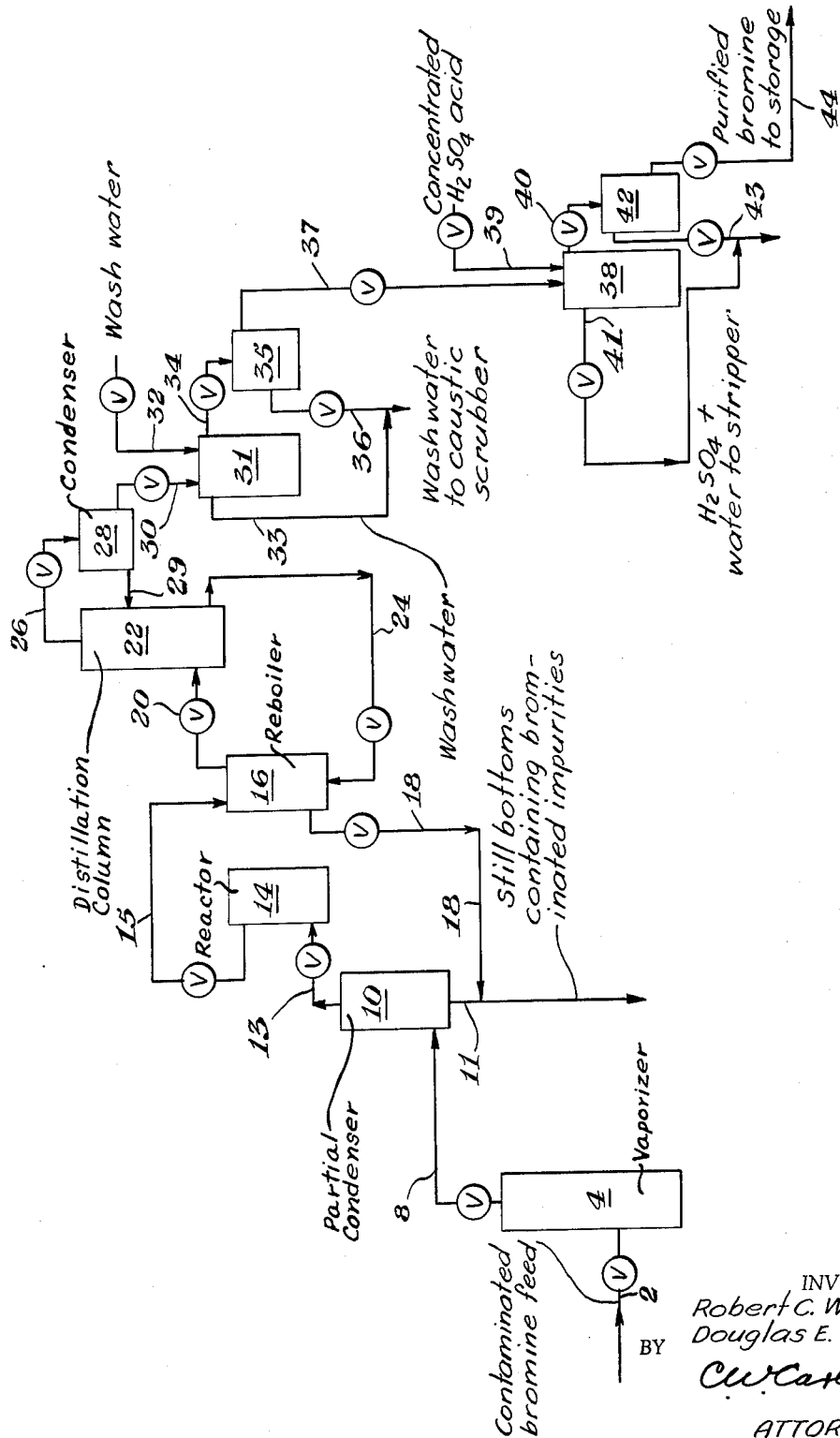

3,233,972
PURIFICATION OF BROMINE
Robert C. Walker and Douglas E. Lake, Midland, Mich., assignors to The Dow Chemical Company, Midland, Mich., a corporation of Delaware
Filed Apr. 18, 1963, Ser. No. 274,014
4 Claims. (Cl. 23—218)

The invention relates to a method of removing impurities from bromine.

Pure bromine is a liquid, at standard pressure, between the temperatures of $-7.2°$ and $58.8°$ C. Below $-7.2°$, it is a solid and above $58.8°$, it is a gas. Bromine is widely used, both as a liquid and as a gas. Among such uses are in the preparation of disinfectants and photographic materials, as an oxidizing agent generally, as an intermediate in the manufacture of dyestuffs, drugs, resins, and refrigerants, and in the preparation of a large number of chemical reagents. It is widely used in the manufacture of antiknock compounds for use in high compression gasoline engines. It is also used in the preparation of pharmaceuticals.

For a number of uses, bromine must be in a high state of purity. Certain compounds are very persistent contaminants in bromine, among which are chloroform, ethylbromide, ethylenechlorobromide, dibromochloromethane, carbon tetrabromide, and bromodichloromethane. Chloroform is considered to be the most troublesome of these contaminants because its boiling point is very close to that of bromine and, accordingly, it cannot be separated from bromine by fractional distillation.

Efforts have been made to provide better ways of separating bromine from its contaminants. Among such efforts are attempts to treat the contaminated bromine with ultraviolet light, with mixtures of chromic acid and sulfuric acid, and by steam distillation. One method consists of admixing sulfuric acid with the bromine to be purified, passing oxygen gas therethrough to produce an effluent mixture of bromine gas and oxygen gas, subjecting the resulting gaseous mixture to a temperature of at least $1000°$ C. to decompose the contaminants, and thereafter freezing the bromine to permit its separation from the decomposed contaminants which have a higher solidification temperature.

Ultraviolet light treatment has not proved satisfactory because a substantial portion of the impurities are not removed thereby. Although the use of steam is satisfactory for the removal of some of the less volatile impurities, it leaves 25 to 50 parts per million (p.p.m.) of known volatile impurities and 80 to 140 p.p.m. of chloroform, which is usually present. Mixtures of sulfuric acid and chromic acid are not fully satisfactory because of the high decomposition rate of chromic acid in this mixture which makes it unsuitable commercially. The practice of the process requiring a temperature of at least $1000°$ C., when treating a mixture as a reactive as that of sulfuric acid and bromine, is obviously impractical for general use. Only quartz glass has shown itself to be sufficiently resistant to the attack of this reaction mixture to be used in vessels in this process, and this material, is not satisfactory for general use.

There has been an increased awareness of a desideratum for an improved method of purifying bromine in recent years, due to the increased demands for bromine in a state of high purity. Heretofore this desideratum has not been met for commercial production.

The invention, however, does meet this desideratum by providing an improved method which is more efficient and more effective than those known heretofore. It is a marked technical advancement over known methods and offers the advantages of safety, economy of equipment and of operating costs, and produces bromine of improved purity.

How the method of the invention is carried out is set forth in the ensuing description and is defined succinctly in the appended claims.

The invention is a method of purifying bromine of organic impurities, which consists essentially of heating the bromine, requiring purification, at a temperature above about $425°$ C. but less than about $625°$ C. to convert organic impurities to bromine compounds and thereafter separating the bromine compounds as made from bromine by fractional distillation.

In carrying out the invention, the bromine is usually first dried, then vaporized to a gas, thereafter heated to a temperaure greater than $425°$ C. and preferably at least about $475°$ C. and less than $625°$ C. and preferably less than about $525°$ C. to convert the contaminating organic materials present therein into brominated high boiling compounds, and the thus heated bromine then fractionally distilled, whereby the bromine is volatilized off leaving the high boiling brominated material.

When bromine, contaminated with organic impurities, is subjected to heating at a temperature below about $425°$ C., the organic impurities present in the bromine are not sufficiently altered to provide for their subsequent separation by fractional distillation. When a temperature above about $700°$ C. is employed, the organic impurities are completely decomposed but structural materials which are sufficiently resistant to corrosive attack of bromine at such advanced temperatures and which have strength properties necessary for industrial operations are not readily available.

The length of time necessary for heating the contaminated bromine to brominate the organic contaminants present, at the required temperature, is almost instantaneous. About 0.1 of a second is considered sufficient time. On the other hand, heating at the required temperature for a prolonged period of time does not in any way defeat the objectives of the invention. However, such prolonged heating does not contribute to the improved purification of the bromine and is, accordingly, not recommended for economic reasons.

The method of the invention may be practiced by providing a steady flow of bromine to be purified or it may be practiced by providing an intermittent flow as by purifying a given amount of bromine in a batch operation.

The method of the invention is best carried out as a continuous process. The attached drawing schematically shows an apparatus useful in the practice of the invention. In carrying out the invention by continuous operation, employing the apparatus of the drawing, crude bromine to be purified is introduced through pipe 2 into vaporizer 4 where it is heated to the boiling point of bromine, whereby bromine feed is vaporized. The thus vaporized bromine is carried upwardly and out through pipe 8 into partial condenser 10, which is also maintained above the boiling point of bromine. Some contaminants such as $H_2SO_4$ and higher boiling organic contaminants present in the feed bromine, are entrained in the outgoing bromine vapor, are separated in partial condenser 10, and pass out through pipe 11. Gaseous bromine from partial condenser 10 passes out through pipe 13 into reactor 14 where the gaseous bromine is subjected to a temperature about $425°$ C. and below $625°$ C. whereby organic contaminants in the bromine are converted to higher-boiling brominated contaminants passes through pipe 15 into reboiler 16 where the temperature is lowered to and maintained at the boiling point of bromine so that both liquid and gaseous bromine are present therein. In the reboiler, a still bottom portion of contaminants is removed through pipe 18, which joins pipe 11. The gaseous bromine, which yet contains an appreciable portion of the now brominated contaminants in the gaseous state, passes from the reboiler through pipe 20 into distillation column 22 which is maintained at the boiling point of bromine. The distillation column is conveniently filled with glass, porcelain, baryl, or ceramic beads, saddles, rings, or the like which assist in condensing and separating the higher boiling brominated contaminants which gradually pass downwardly in column 22 and are drawn off through pipe 24. Gaseous bromine, thus freed of higher boiling brominated contaminants, passes upwardly and out through overhead pipe 26 into condenser 28 where the bromine is condensed to a liquid. From condenser 28, a minor portion of the liquid bromine is returned through pipe 29 to the upper part of column 22 to serve as a countercurrent downward liquid flow therein. The major portion of the liquid bromine leaves the condenser through pipe 30 and enters washer 31, where a flow of water entering by way of pipe 32 absorbs HCl and HBr that may be present in the liquid bromine and largely passes out through pipe 33. The liquid bromine, together with some water, passes through pipe 34 into separator 35. From separator 35, the remaining water containing any unremoved HCl or HBr, is carried away through pipe 36 (which joins pipe 33) and the HCl and HBr therein may be salvaged, as by passing it into an aqueous solution of caustic (not shown), e.g., an aqueous sodium hydroxide solution. The purified liquid bromine from separator 34 passes through line 37 into drier 38, which contains a drying medium, e.g., concentrated $H_2SO_4$ acid, introduced through pipe 39. The $H_2SO_4$ containing added water from the bromine passes out through pipe 41 from the drier. The liquid bromine then passes to separator 42, where any remaining $H_2SO_4$ is removed through pipe 43, which joins pipe 41. The purified and dried bromine from the separator is passed through pipe 44 to storage.

Appropriate heating and cooling means are provided for the various units of the apparatus as required by the method of the invention. Flow control means, e.g., valves, are indicated by the symbol V.

Although the drawing schematically represents a suitable apparatus for carrying out the invention, it is understood that other apparatus may also be used. For example, a more simple apparatus may be used consisting essentially of only a vaporizer, reactor, and distillation column together with suitable feed lines, transfer lines, outlet lines, and heat and flow control means.

Heat for vaporization, for reaction to brominate the impurities, and for distillation may be provided by known means and techniques employing gas or electrical means. Cooling fluids circulating through coils of conventional design may be used where reduction in temperature is desired.

In the practice of the invention by continuous operation, the rate of input and output is automatically controlled, as by thermostatic controlled valves, to maintain sufficient time for the contents of the different units of the system, e.g., the vaporizer, reactor, and distillation column, to be raised or lowered to the desired temperature.

Examples 1 and 2 below illustrate the practice of the invention. Test runs 3 and 4 are not in accordance with the invention and are for comparative purposes.

EXAMPLE 1

Bromine, having present therein contaminants comprising about 100 p.p.m. chloroform, was vaporized and the resulting vapors raised in temperature to 600° C. in a vessel and then cooled. It was analyzed by infrared spectrum and shown to contain about 135 p.p.m. of brominated organic compounds, largely $CBr_4$. The thus heated contaminated bromine was then distilled and the so distilled bromine again tested by infra spectrum and found to be completely free from the brominated compounds.

EXAMPLE 2

The procedure of Example 1 was repeated except that contaminated bromine was raised to 500° C. and then cooled. By infrared spectrum, at this point, it showed presence of between about 125–150 p.p.m. of brominated organic compounds, largely $CBr_4$. After distillation of the so treated contaminated bromine and recovery of the condensed bromine, it was again tested and found to be completely free from the brominated organic compounds.

*Test run A*

The procedure of Examples 1 and 2 was repeated except that contaminated bromine was raised to only 400° C. and then cooled. After heating, it was found, by infrared spectrum, to contain both fully brominated and unbrominated organic compounds. After distillation and recovery of the bromine so distilled, it was again examined by infrared and found to contain less of the brominated compounds but to contain also small amounts of original organic contaminants, e.g., $CHCl_3$, which had not been fully brominated and therefore not removed by distillation.

*Test run B*

The procedure of Examples 1 and 2 was again repeated except that contaminated bromine was heated to only 300° C. When then cooled and tested by infrared techniques, it was found to contain the original contaminating materials unaffected. When subsequently distilled and again examined by infrared, the contaminated bromine remained unchanged. The treatment had not removed any of the organic contaminants from the bromine.

Reference to the examples shows that the heating temperature is critical; that when heated at 400° C. or less, the contaminants in the bromine remain incompletely or substantially not at all reacted and cannot be subsequently removed by distillation. It also shows that when the contaminated bromine is heated at a temperature substantially above 400° C., the organic contaminants are converted into higher boiling compounds which are thereafter readily separated by distillation, leaving substantially pure bromine.

It is clear from the marked reduction of organic impurities in bromine, after being heated at 400° C. and the thus treated bromine distilled at the boiling point of bromine, that any temperature substantially above 400° C. (e.g., about 425° C.) but below about 625° C., at which undesirable corrosivity of commonly available materials becomes pronounced, is satisfactory for the heating temperature of the invention.

Having described our invention, what is claimed and desired to be protected by Letters Patent is:

1. The method of purifying bromine which is contaminated by low boiling organic compounds which consists essentially of vaporizing the contaminated bromine and thereafter heating the vapors so made at a temperature of at least about 425° C. and below about 625° C. for at least about 0.1 second to convert said low boiling contaminants into high boiling compounds, cooling the so heated contaminated bromine vapors to a temperature below the boiling point of the high boiling compounds, subjecting the thus successively heated and cooled contaminated bromine to the boiling temperature of bromine, and distilling off the bromine leaving the contaminants.

2. The continuous method of separating bromine from low boiling organic contaminants present therein which consists essentially of continuously vaporizing bromine, continuously subjecting the vaporized bromine containing said low boiling organic contaminants to a reaction temperature of at least about 425° C. and less than about 625° C. to convert said low-boiling organic contaminants into high boiling bromine compounds, continuously fractionally distilling the thus treated bromine, at the boiling point of bromine, whereby purified bromine gas is distilled over, leaving the high boiling bromine compounds, continuously condensing the bromine gas being distilled over, and removing the high boiling bromine compounds remaining behind from the fractional distillation.

3. The method according to claim 2 wherein said reaction temperature is between about 475° C. and about 525° C.

4. The method according to claim 1 wherein said heating is carried out at between about 475° C. and about 525° C.

References Cited by the Examiner

UNITED STATES PATENTS

| | | | |
|---|---|---|---|
| 132,296 | 10/1872 | Lerner et al. | 23—218 X |
| 1,324,761 | 12/1919 | Carter | 23—218 |
| 1,956,993 | 5/1934 | Martin | 23—218 |
| 2,016,804 | 10/1935 | Nichols | 260—652 X |
| 2,784,063 | 3/1957 | Block et al. | 23—218 |
| 2,916,506 | 12/1959 | Axetell et al. | 202—61 X |
| 3,084,028 | 4/1963 | Foulletier et al. | 23—218 X |
| 3,127,243 | 3/1964 | Konikoff | 202—66 X |

NORMAN YUDKOFF, *Primary Examiner.*

GEORGE D. MITCHELL, *Examiner.*